UNITED STATES PATENT OFFICE.

AUGUSTUS MORRIS AND JAMES AUGUSTUS PARKER, OF SYDNEY, NEW SOUTH WALES.

PRESERVATIVE COATING FOR FOODS.

SPECIFICATION forming part of Letters Patent No. 556,470, dated March 17, 1896.

Application filed July 10, 1895. Serial No. 555,545. (No specimens.)

*To all whom it may concern:*

Be it known that we, AUGUSTUS MORRIS and JAMES AUGUSTUS PARKER, of Sydney, in the Colony of New South Wales, have invented certain new and useful Improvements in Means for Preserving Fruit, Vegetables, Meats, &c.; and we do hereby declare the following to be a full, clear, and exact description of the invention, such as will enable others skilled in the art to which it appertains to make and use the same.

Our invention relates to an improvement in means for preserving fruit, vegetables, meats, cheese, eggs, confectioneries, &c., the object of the invention being to envelop the fruit or other eatable in an artificial skin or coating to prevent the access of germs from the air, which, if permitted to penetrate the natural skin, would set up putrefactive fermentation.

A further object is to prevent the evaporation of the water from the juices of the fruit and prevent shriveling and toughening.

A further object is to prevent oxidation and consequent rancidity of ham and bacon.

A further object is to stop evaporation and early decay in cheese.

A further object is to so close the pores of the shells of eggs that no evaporation nor absorption of oxygen or other external injurious agent can take place.

With these objects in view the invention consists in certain combinations of ingredients for forming an artificial skin or coating on fruit, &c., substantially as hereinafter set forth, and pointed out in the claims.

To carry our invention into effect, we dip the fruit or vegetables, hams, bacon, cheese, eggs, &c., into a spirit composition made of such materials as will leave a tough elastic coating or artificial skin after the solvent shall have evaporated, or we paint the substances with the spirit composition. Such composition we make by dissolving lac or other suitable resinous substance in spirit of wine or methylated spirit, and we find that satisfactory results are obtained by dissolving in one gallon of spirit two pounds of shellac and one pound of resin, both having been first softened by the addition of as much ether as they will take up, by which process the spirit more readily dissolves the resinous substances, twenty per centum of prepared uniodized collodion calculated on the quantity of solids in the composition, the collodion being prepared by mixing one ounce of Canadian balsam, one ounce of castor-oil to twelve ounces of uniodized collodion. Then half per centum of beeswax is dissolved in ether in the proportion of one part of beeswax to eight parts of ether. It is essential that the wax should be dissolved in ether; but it is not so essential that the resinous substances should be softened by it, as they will otherwise, though more slowly, dissolve in spirits of wine. All these ingredients when mixed make our improved spirit composition.

To one gallon of spirits we often use a less quantity of the resinous substances with relatively lessened or increased proportions of the other ingredients. For instance, in treating eggs or ripe table grapes for preservation lessened quantities are desirable; but the spirit must, in the case of grapes, be pure and not methylated, and in treating soft fruits, hams, bacon, and cheese the stronger solutions made by pure spirit are found preferable.

We apply our solution to the food stuffs—as fruits, vegetables, hams, bacon, cheese, or newly-laid eggs—by dipping the food into a vessel containing the solution or by painting with a brush. When the water of the solution shall have evaporated, the articles of food will be covered with the desired coating or artificial skin.

The coating can be easily removed by washing with spirit or by a warm solution of half an ounce of borax to a quart of boiling water.

Having fully described our invention, what we claim as new, and desire to secure by Letters Patent, is—

1. A solution for forming a preserving coating or envelope for food, consisting of a resinous substance, spirit of wine, collodion and wax dissolved in ether, substantially as set forth.

2. A solution for forming a preserving coating or envelope for food, consisting of a resinous substance, spirit of wine, wax dissolved in ether, uniodized collodion, Canadian balsam and castor-oil, in substantially the proportions stated.

3. A solution for forming a preserving coating or envelope for food, consisting of spirit of wine, shellac, resin, uniodized collodion mixed with Canadian balsam and castor-oil, and beeswax dissolved in ether, in substantially the proportions stated.

In testimony whereof we have signed this specification in the presence of two subscribing witnesses.

AUGUSTUS MORRIS.
JAMES AUGUSTUS PARKER.

Witnesses:
ALICE ELIZABETH MILLER,
W. H. DAWSON.